United States Patent
Schmid

(10) Patent No.: US 10,987,824 B2
(45) Date of Patent: Apr. 27, 2021

(54) METHOD FOR COATING UNEVEN SURFACES, APPARATUS AS WELL AS COMPONENT

(71) Applicant: HOMAG GmbH, Schopfloch (DE)

(72) Inventor: Johannes Schmid, Starzach-Wachendorf (DE)

(73) Assignee: HOMAG GmbH, Schopfloch (DE)

( * ) Notice: Subject to any disclaimer, the term of this patent is extended or adjusted under 35 U.S.C. 154(b) by 339 days.

(21) Appl. No.: 15/803,667

(22) Filed: Nov. 3, 2017

(65) Prior Publication Data

US 2018/0117789 A1    May 3, 2018

(30) Foreign Application Priority Data

Nov. 3, 2016    (DE) .......................... 102016221577.9

(51) Int. Cl.

| | |
|---|---|
| *B27K 3/02* | (2006.01) |
| *B29C 63/04* | (2006.01) |
| *B27D 5/00* | (2006.01) |
| *B27M 3/18* | (2006.01) |
| *B05D 5/10* | (2006.01) |
| *E06B 3/74* | (2006.01) |

(52) U.S. Cl.
CPC .................. *B27K 3/02* (2013.01); *B05D 5/10* (2013.01); *B27D 5/003* (2013.01); *B27M 3/18* (2013.01); *B29C 63/042* (2013.01); *B29C 63/044* (2013.01); *E06B 3/74* (2013.01)

(58) Field of Classification Search
None
See application file for complete search history.

(56) References Cited

U.S. PATENT DOCUMENTS

| | | | | |
|---|---|---|---|---|
| 3,606,508 A | * | 9/1971 | Burnes ................... | A47B 13/08 312/140.3 |
| 2007/0125021 A1 | * | 6/2007 | Thiers .................... | B27D 5/003 52/288.1 |
| 2008/0216945 A1 | * | 9/2008 | Kato ...................... | B27D 5/003 156/196 |

FOREIGN PATENT DOCUMENTS

| | | |
|---|---|---|
| CN | 105848855 A | 8/2016 |
| DE | 7320854 U | 6/1999 |

(Continued)

OTHER PUBLICATIONS

Extended European Search Report from European Patent Application No. 17199881.8, dated Jan. 17, 2018, 10 pages.

*Primary Examiner* — Barbara J Musser
(74) *Attorney, Agent, or Firm* — Morgan, Lewis & Bockius LLP

(57) ABSTRACT

The present invention relates to a method and an apparatus (40, 50) for coating an uneven surface of a workpiece (W), wherein the apparatus (40, 50) comprising a first feeding device (41), through which a coating material (10) applicable to a workpiece (W) is fed, the coating material (10) comprising at least one weakened area (10a), a joining device for the application of the coating material to at least two workpiece sides (W1-W), wherein the at least one weakening area (10a) being positioned in the transition section of the at least two workpiece sides (W1-W2), and a second feeding device (70), through which the workpiece is fed and the transition section of the two workpiece sides (W1, W2) being formed to at least partially fill the weakened area of (10a) of the coating material (10) which is positioned in the transition section during the application of the coating material.

18 Claims, 5 Drawing Sheets

(56) References Cited

FOREIGN PATENT DOCUMENTS

| | | |
|---|---:|---|
| DE | 29904124 U1 | 6/1999 |
| DE | 19947164 C1 | 8/2001 |
| DE | 10-2009-036036 A1 | 8/2010 |
| DE | 102015208172 A1 | 11/2016 |
| EP | 0531261 A2 | 3/1993 |
| EP | 1388635 A2 | 2/2004 |
| EP | 1479494 A2 | 11/2004 |
| EP | 2239115 A1 | 10/2010 |
| EP | 2918392 A1 | 9/2015 |
| EP | 3090857 A1 | 11/2016 |

\* cited by examiner

METHOD FOR COATING UNEVEN SURFACES, APPARATUS AS WELL AS COMPONENT

CROSS-REFERENCE TO RELATED APPLICATIONS

This application claims priority under 35 U.S.C. § 119 to German Patent Application DE102016221577.9, filed on Nov. 3, 2016, the disclosure of which is incorporated herein by reference in its entirety.

TECHNICAL FIELD

The present invention relates to a method for coating uneven surfaces such as, for example, a door rabbet, an apparatus for coating such surfaces, as well as a component. Such surfaces are found, for example, in the field of furniture and construction supplies industries

PRIOR ART

In the prior art, it is known to provide a strip-like or band-like coating material with an adhesive agent and, for example, to apply it on a narrow side of a workpiece. If the surface to be coated is formed unevenly, i.e. purely by way of example it comprises edges or corners, a relatively thin coating material can be used to press this at the given surface and thus to bend around an edge or corner However, such thin coating materials have the disadvantage that they are relatively sensitive to impact, particularly in the area of the edges due to the aforementioned processing.

Furthermore, with the aforementioned coating materials that are provided shortly before the application to a workpiece with an adhesive agent, adhesive agent residues remain and a joint between the actual coating material on the workpiece to be coated is visible.

With the coating of comparatively complicated geometries, the variants depicted in FIGS. 1a and 1b are furthermore known. In FIG. 1a, a first workpiece side W1 of a workpiece W is provided with a first coating material 1, which coating material 1 protrudes beyond a second workpiece side W2 to be coated. The second workpiece side W2 and a workpiece side W3 of workpiece W arranged at a right-angle opposite the second workpiece side W2 is coated with a second coating material 2 which in sections is covered by the overlapping region of the first coating material 1.

In FIG. 1b a so-called three-strip technology is depicted in which a total of three coating materials are used. In particular, the parallel sides of the workpiece W are provided with coating materials 1, 4, while the second workpiece side W2 disposed perpendicular thereto is provided with a further coating material 3 which is covered in sections by coating material 1 and by coating material 4.

The depicted coating methods have the shared problems that joints remain between the individual coating materials 1 to 4, which disrupt an appealing, high-quality optical appearance and furthermore the individually glued coating materials are liable to become detached from the edge over the lifetime of the coated product.

To solve the above-mentioned problems, a so-called zero joint strategy is being pursued recently. This means that with an edge situation as depicted in FIGS. 1a and 1b only one coating material is used to coat all three workpiece sides W1 to W3. This offers the advantage that only two visible joints are present on both ends of the coating material, and not four visible joints as with, for example, the coating methods depicted in FIG. 1b. Such a coating is shown in FIG. 2.

As revealed in FIG. 2, the coating material is preferably provided with weakened areas 5a, 5b which, for example are positioned at both transition sections between the workpiece sides W1, W2 and W2, W3. The weakened areas 5a, 5b make it possible that the coating material can be more easily guided to and applied to uneven surfaces of a workpiece such as corners and edges. A breaking of the coating material is therefore prevented in these areas and the quality of the coating is improved. Furthermore, comparatively thick coating materials can be used. In this manner, the value of the coated component can be raised.

As FIG. 2 and in particular FIG. 3 which is an enlarged view of FIG. 2 show, with such coatings cavities H1, H2 form between the workpiece W and the coating material 5. The cavities H1, H2 are enlarged further owing to the provided weakened areas 5a, 5b. Moisture can accumulate between the coating material and the workpiece W in the cavities H1, H2 formed thereby, which can lead to changes to the color of the coating material as well as the coating material detaching from the workpiece W.

SUBJECT MATTER OF THE INVENTION

The aim of the present invention is to provide a method for coating uneven materials of a workpiece as well as an apparatus to be able to coat workpieces with uneven surfaces in an efficient manner and with high quality.

The object is solved by a method according to claim 1 and an apparatus according to claim 11 as well as a component according to claim 18. Preferred embodiments of the invention are provided in the dependent claims.

A core idea of the present invention is to perform such a chipping machining at a transition section of two workpiece sides of the workpiece, which in particular are arranged at a right-angle to one another, and where at least one weakened area of a coating material is positioned to at least partially fill the weakened area of the coating material.

It is possible by means of the proposed method in a simple and efficient way to avoid cavities between a workpiece and a coating material, in particular in transition sections between two workpieces which in particular are arranged at right-angles to one another and upon which weakened areas of the coating material are positioned. In this manner, it is possible to prevent moisture from accumulating between the coating material and the workpiece and to thereby ensure a high-quality coating over the lifetime of a product. By doing so, the compressive strength of the transition section between the workpiece sides can be improved and increased. Furthermore the proposed method offers the advantage that at connecting corners a chamfer geometry of a present transverse coating with the additional longitudinal coating can be designed so that they are one on top of the other without any increase in profile. A mitre between these can be optically closed (entirely). A disruptive mitre joint can be thereby avoided.

According to the present invention, the method for coating uneven surfaces of a workpiece, in particular of a workpiece preferably consisting at least in sections of wood, wood materials, or wood substitute materials, comprises the steps: applying a coating material, the coating material having at least one weakened area, applying the coating material to at least two workpiece sides which are arranged in particular angled to one another, with the at least one weakened area being positioned in the transition section of the at least two workpiece sides, in particular in the area of a corner, and with the transition section of the at least two workpiece sides being formed in such a way to at least partially fill out the weakened area of the coating material.

An uneven surface within the meaning of the present invention is, for example, a surface assembled of different workpiece sides, which workpiece sides particularly merge at angles and/or over one or more radii. Examples of uneven surfaces are a corner or an edge of a particularly plate-shaped workpiece. In particular, a narrow side can have a corner and/or edge. Such surfaces occur, for example, in the area of a door rabbet.

Furthermore, the method described within the scope of the present invention can be used in the field of stationary technology and also in the field of feed-through technology. The workpieces to be processed are particularly plate-shaped and have, for example, one or more edges or corners and thereby have an uneven surface as is present, for example, in a door rabbet.

In the field of stationary technology, a workpiece is held, for example, by means of suction clamps or clamping devices and a coating aggregate is moved with a pressure roller or a pressure shoe relative to the held workpiece. By contrast, in the event of a feed-through process, the workpiece is moved relative to a coating aggregate.

In this manner, a method for coating uneven surfaces of the workpiece is provided in which, despite the use of comparatively thick coating materials, the use thereof is able to increase the value of the coated component and the weakened areas which thereby become necessary, cavities between the workpiece and the coating material can be avoided. The commonly occurring cavities can be filled or avoided by the corresponding design of the transition section between the at least two workpieces.

According to one embodiment of the present invention, the transition section has a chamfer and/or a curved section, in particular a chamfer and/or a curved section having an indent.

The provided method is capable of providing in particular by means of simple machining operations such as chipping machining for example, chamfers and/or curved sections on transition sections of a workpiece which are formed so that they at least partially fill the weakened area of the coating material and the resulting cavity between the coating material and the workpiece.

Furthermore, the size of the chamfer and/or the curved section is preferably dependent on the thickness of the coating material. This means that if a thicker coating material is used for coating the workpiece, this generally has a larger, particularly deeper weakened area, which is why the transition section of the workpiece is provided with a larger chamfer or a larger curved section. Through the larger formation of the chamfer, this can extend further into the weakened area of the coating material and can thereby fill this further.

According to a preferred embodiment of the present invention the at least one weakened area is a recess which when seen in cross-section of the coating material formed particularly V-shaped, W-shaped, at a right-angle or semi-circular, and/or the weakened area is formed by a plurality of slots or blind holes in the coating material, with the weakened area being particularly formed at least approximately complementary to the transition section.

In this manner, the thickness of the coating material can be reduced in sections and thereby the pliability of the coating material can be increased in this area. Furthermore, in the event of an at least approximately complementary formation of the weakened area towards the transition section, particularly complementary to the chamfer and/or the curved section of the transition section, the weakened area of the coating material can be filled further, preferably almost completely, and hollow areas between the workpiece and the coating material can be even be avoided better.

Alternatively or simultaneously, the weakened area is formed as a porous area of a carrier layer of the coating material to increase the pliability of the coating material correspondingly in sections. In particular, it can be a microporosification of the carrier layer.

Preferably a coating material the coating material of which, in particular narrow edge coating material, is provided for coating an uneven surface of a workpiece such as, for example, a door rabbet, in particular workpiece sides which are arranged angularly to one another. The coating material comprises a carrier layer as well as an activatable or reactiveable adhesive layer. Furthermore, the coating material has at least one weakened area. For example, it can be a strip-shaped or band-shaped coating material which can be attached to a narrow side or a wide side of a preferably plate-shaped workpiece.

In one embodiment, the coating material is a co-extruded coating material, with in particular the carrier layer and adhesive layer being co-extruded, or the carrier layer of the coating material being provided with an adhesive layer.

In further embodiments, the carrier layer of the coating material is formed at least in sections from PVC, polystyrene, in particular from ABS, from PP, PE, polycarbonate and/or polymethylmethacrylate (PMMA) as HPL, CPL, melamine paper or as veneer, or a combination thereof.

Furthermore, it is preferred that the adhesive layer of the coating material has color pigments and preferably has the same color as the carrier layer to conform to the coloring of the adhesive layer upon that carrier layer.

The coating material preferably has a thickness of at least 0.5 mm to 4 mm, preferably 0.7 to 4 mm, more preferably 1.5 mm to 4 mm, the adhesive layer in particular comprising a thickness of 0.1 to 0.3 mm. Due to the weakened area and the particular formation of the transition section, coating materials with a comparatively larger thickness can thereby also be used without large cavities forming between the workpiece and the coating material.

In one embodiment of the method, the at least one weakened area is generated on the workpiece during feeding of the coating material and/or during the application of the coating material. The flexibility of the method is thereby further increased and the positioning accuracy of the weakened area is improved.

Preferably the coating material has a carrier layer and an adhesive layer, with the weakened area being generated on the carrier layer before application of the adhesive layer to the carrier layer or after the application of the adhesive to the carrier layer.

If the weakened area is applied before the application of the activatable or reactivatable adhesive layer, the adhesive layer to be applied subsequently can be specially matched to the already present weakened area. The processing sequence can thereby be performed within one machine.

Alternatively, as mentioned above, the weakened area is applied to the carrier layer after application of the adhesive layer. Thus, an already usable coating material is kept available, for example in the form of a wrap, and the weakened area is generated therein. It is thereby preferred that the coating material is fed and, for example, at least one weakened area is generated in a coating machine. In this manner, the flexibility is increased further.

According to a further embodiment of the method of the present invention, a connecting corner of the workpiece W is coated using two coating materials, in particular using a longitudinal coating and a transverse coating, with the connecting corner having a longitudinal side and a transverse side which preferably are arranged at right angles to one another, and each having at least two workpiece sides, which in particular are arranged at right angles to one another, that one of the two workpiece sides of the transverse side is identical to one of the two workpiece sides of the longitudinal side, at least one transition section of both sides is formed with a chamfer, in particular a chamfer at an angle of 45°, and both coating materials in the extension of the transition section having complementary chamfer such that they lie on top of one the other without an increase in profile.

In this manner, a connecting corner of a workpiece, in particular a door, can be provided, in which a chamfer geometry of the transverse coating with the longitudinal coating can lie top of each other without creating a disruptive increase in profile. This can optically (entirely) close the mitre. A disruptive mitre joint can thereby be avoided.

Furthermore, the present invention relates to an apparatus for coating an uneven surface of a workpiece, in particular a workpiece that preferably consists at least in sections of wood, wood materials, or wood substitute materials, in particular when performing the method described above, which has: a first feeding device, through which a coating material to be applied to a workpiece is fed, the coating material being at least one weakened area, a joining device for applying the coating material to at least two workpiece sides of the workpiece, which in particular are arranged angularly to one another, with the at least one weakened area being positioned in the transition section of at least two workpiece sides, in particular in the area of an inner corner, and a second feeding device through which the workpiece is fed and the transition section of two workpiece sides of the fed workpiece being formed in such a way to at least partially fill the weakened area of the coating material which is positioned in the transition section, during the application of the coating material.

Moreover, the apparatus can have a separating apparatus through which the transition section of the two workpiece sides of the workpiece, which in particular are arranged angularly to one another, is machinable so as to separate such, in particular able to be chipping machined to at least partially fill the weakened area of the coating material which is positioned in the transition section.

Furthermore, the apparatus can have a device for placing the weakened area in the coating material to be applied, with the at least one weakened area being able to be generated in the coating material to be applied by separation, with the separation preferably being by chipping machining, in particular by means of a milling tool, a saw, a scraping tool, a grinding belt, and/or by cutting up, in particular by means of a knife or one or more needles, and/or by removal, in particular by thermal separation, etching, or electrochemical removal.

By doing so, in particular the thickness of the carrier layer of the coating material is reduced in sections and the pliability of the coating material is thereby raised in this area. Furthermore, the shape of the weakened area can be specifically adapted to the shape of the transition section and the cavity between coating material and workpiece can be thereby minimized.

Alternatively or additionally, the weakened area can be generated in the coating material by reshaping in particular by means of an embossing roller or a stamp. In particular the thickness of the carrier layer of the coating material is thereby reduced in sections and the pliability of the coating material is thereby increased in this area. Furthermore, in the case that the weakened area is generated starting from the adhesive layer of the coating material, the adhesive layer is maintained to the greatest possible extent.

Within the scope of the invention, the weakened area can be generated in the coating material starting from the adhesive layer or starting from the carrier layer. The requirements concerning coating material can thereby be specifically adapted to the conditions of the workpiece and the shape of the workpiece sides.

According to one embodiment of the present invention, an activation of an adhesive layer of the coating material is performed during a relative movement between coating material and workpiece, with the activation being performed by a power source which in particular is chosen from a laser, hot air source, infrared source, ultrasound source, magnetic field source, microwave source, plasma source, LED source and/or gassing source.

Moreover, the separating apparatus can be formed so that the transition section is machineable so as to separate such that the transition section has a chamfer and/or a curved section, with an indent being attachable to the transition section in particular after forming the chamfer and/or the curved section.

The present invention relates furthermore to a component having a coating, in particular a door, that preferably consists at least in sections of wood, wood materials or wood substitute materials. The components can in particular be coated using the method described above. The component comprises a coating material with at least one weakened area, at least two workpiece sides (component sides), which in particular are arranged angularly to one another, with the at least one weakened area being positioned in a transition section of the at least two workpiece sides (component sides), in particular in the area of an inner corner, and the transition section of the at least two workpiece sides (component sides) being formed in such a way that the weakened area of the coating material is at least partially filled.

In this manner, a component, in particular a door, is provided in which cavities between the workpieces and the coating material can be avoided despite the use of comparatively thick coating materials, owing to which the value can be increased due to the use thereof, and despite the use of the weakened area that becomes necessary owing thereto. The commonly occurring cavities can be filled or avoided by the corresponding design of the transition section between the at least two workpiece sides.

DETAILED DESCRIPTION OF THE PREFERRED EMBODIMENTS

Figure 1A:
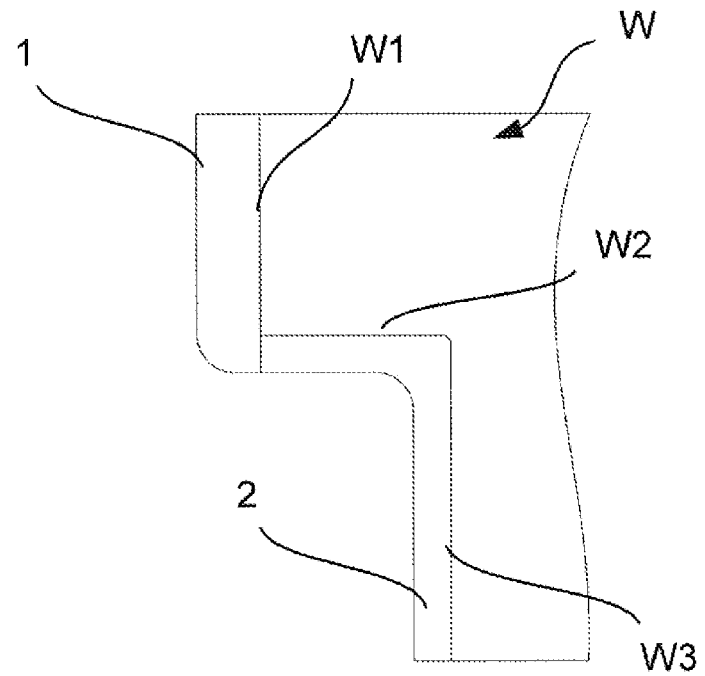
FIGS. 1a, 1b schematically show known coating methods.
Figure 1B:
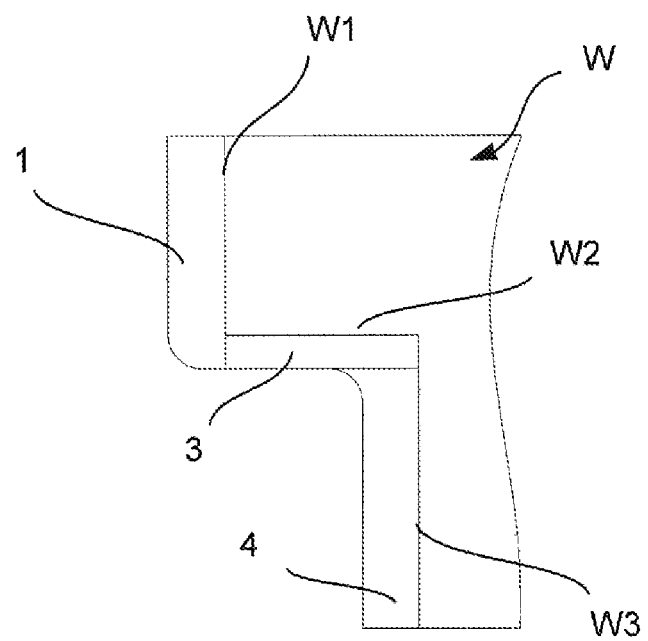

Preferred embodiments of the present invention are described in detail below on the basis of the accompanying figures. Further modifications of certain features that are cited in this connection can each be individually combined with one another to form new embodiments.

Within the scope of the present invention, preferably coating materials 10 are used which are pre-coated. These can be coextruded coating materials 10 where the carrier layer 13 (decorative layer) is produced together with the adhesive layer 14. Furthermore they can be coating materials where firstly the carrier layer 13 is manufactured, for example, in an extrusion process and this carrier layer is subsequently provided, optionally spatially and temporally separate from the production of the carrier layer 13, with an activatable or reactivatable adhesive layer 14. The carrier layer (13) can furthermore have a (thicker) core layer (13*a*) which can be manufactured from the most cost-efficient material.

Furthermore, it is preferred that the adhesive layer 14 is provided with color pigments to adapt the coloring of the adhesive layer 14 to that of the carrier layer 13. Thus, the adhesive layer 14 is not or only barely visually perceptible after the application of the coating material 10 to a workpiece, without reducing the thickness of the adhesive layer 14.

Before the application of a workpiece, such kinds of coating materials 10 are activated by means of a power source in order to place the adhesive layer 14 in a state in which it has an adhesive effect. To activate an adhesive layer 14 in particular a laser, a hot air source, an infrared source, an ultrasound source, a magnetic field source, a microwave source, a plasma source, a LED source and/or a gassing source can be used, where with certain coating materials 10, several of the cited power sources can optionally be used in combination with one another.

The laser enables a particularly fast focusing on a specific area of the coating material 10. Thus, with a laser energy can be provided particularly quickly, enabling high working speeds. A hot air source is, for example available comparatively cheap and requires a relatively low maintenance effort.

Figure 4:
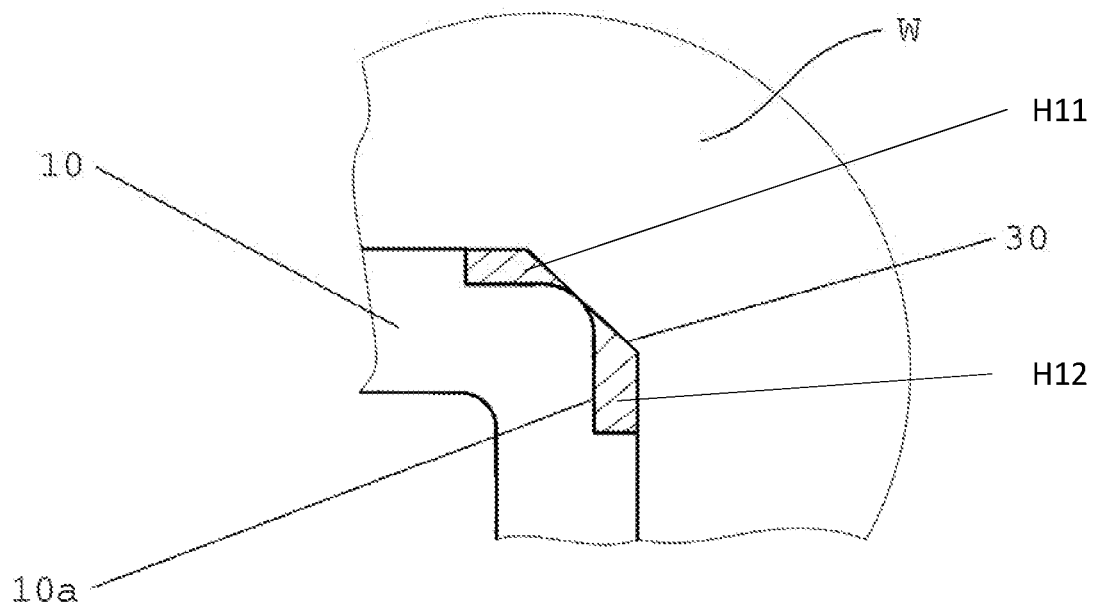

In FIG. 4, a transition section of two workpiece sides W2, W3 is schematically shown which have, for example, an angle of 90°, which is coated using a coating method according to a first embodiment of the present invention. The elements or areas thereof depicted in the figures are depicted with larger dimensions by way of illustration to be able to more clearly describe the objective of the present invention.

As revealed by FIG. 4, the coating material 10 has a weakened area 10*a* which is provided on the coating 10 such that following the coating of the workpiece W it is positioned at the transition section, in particular in the area of an inner corner. Thus, the coating method depicted in FIG. 4 corresponds to the known coating methods known in FIGS. 2 and 3. To at least shrink the cavity H1 depicted in FIG. 3, the transition section has, for example, a chamfer 30 between both workpiece sides W2 and W3. Hereby, the cavity H1 of FIG. 3 is largely avoided, and only two smaller cavities H11 and H12 remain which can easily be filled with an adhesive during the coating.

After the application of an adhesive layer 14 or during said coextrusion process, the weakened area 10*a* can be generated after the coating material 10 has been produced.

By doing so, there is the possibility for the producer of the coating material 10 to provide weakened areas 10, for example, at equal spaces on the coating material 10, to thereby specifically provide a weakening of the coating material 10 in this area. In this manner, the pliability of the coating material 10 is increased in these areas.

Alternatively, it is possible to specifically adapt the coating material 10 to the workpiece W to be coated, for example, a door rabbet. For this purpose, the coating material 10 can be provided with weakened areas 10*a* at the corresponding positions. This step can also occur before the coating material 10 is cut to size, but when the positions of the weakened areas 10*a* are already known owing to information about the workpiece W to be coated. It is also possible to place the weakened areas 10*a* in a coating material 10 which is already cut to size.

Furthermore, it is possible to place the at least one weakened area 10*a* in the coating material 10 before application of the adhesive layer 14 to a carrier layer 13 of the coating material 10. Alternatively, it is possible to place the at least one weakened area 10*a* after application of the adhesive layer 14 in the coating material 10, i.e. either starting at the side of the carrier layer 13 (visible side) or by starting from the side of the adhesive layer 14 (application side/adhesive side).

Alternatively, it is possible to attach the coating material 10 to a first workpiece side W1, to subsequently place the at least one weakened area 10*a* at the corresponding position or the coating material 10, and subsequently to apply the coating material 10 to the further workpiece sides W2, W3 to be coated which, in the present example, are oriented angularly to the first workpiece side W1. In this manner, the pliability can be increased and simultaneously the accuracy of the positioning of the weakened areas 10*a* can be improved further.

Figure 2:
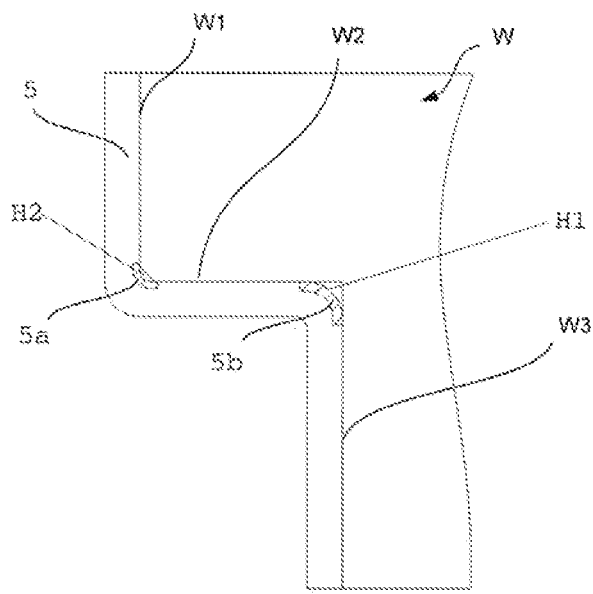
FIG. 2 schematically shows a further known coating method.
Figure 3:
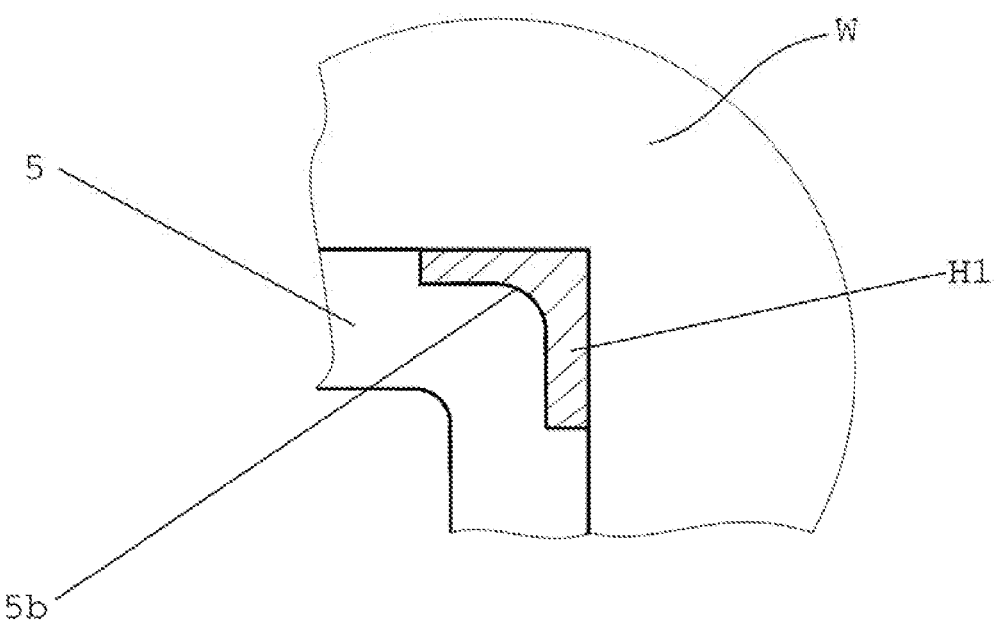
FIG. 3 schematically shows a section of a transition section of the coating method depicted in FIG. 2, FIG. 4 schematically shows a transition section of the coating method according to a first embodiment of the present invention, FIG. 5 schematically shows the transition section of the coating method according to a second embodiment present invention.

As visible in FIG. 2, a weakening of the coating material can be specifically generated in the corner and edge area where workpiece sides W1-W3 angularly merge into one another so that the coating material can be guided around the corner and edge areas during the coating process.

The shown weakened areas 10*a* can be generated in the coating material 10 by a machine according to a first variant. A milling tool or a sawing tool can be used, for example, for this. Alternatively, it is possible to push the weakened areas 10*a* into the coating material 10 by applying pressure or by means of a stamping tool so that, for example, the carrier layer 13 of the coating material 10 is compressed into the weakened area.

Imprinting the weakened areas 10*a* can occur with coextruded coating materials 10 during production thereof over the course of the extrusion.

Alternatively, it is possible to place the weakened area 10*a* in an already-formed coating material 10. The coating material 10 and the carrier layer 13 of the coating material 10 can thereby be present in a partially or fully hardened state.

If the coating material 10 or the carrier layer 13 is present in a partially hardened state during imprinting of the weakened areas 10a, the embossing process can be performed with a low amount of force being applied.

In case the embossing process is performed when the coating material 10 or the carrier layer 13 is already fully hardened, the pliability can be increased since the coating material 10 can be, for example, stored temporarily, in particular rolled up.

A further possibility is to generate the weakened area 10a by means of a porosification, preferably a microporosification, which is achieved, for example, by treatment with a substance which reacts with the carrier layer 13.

Figure 5:
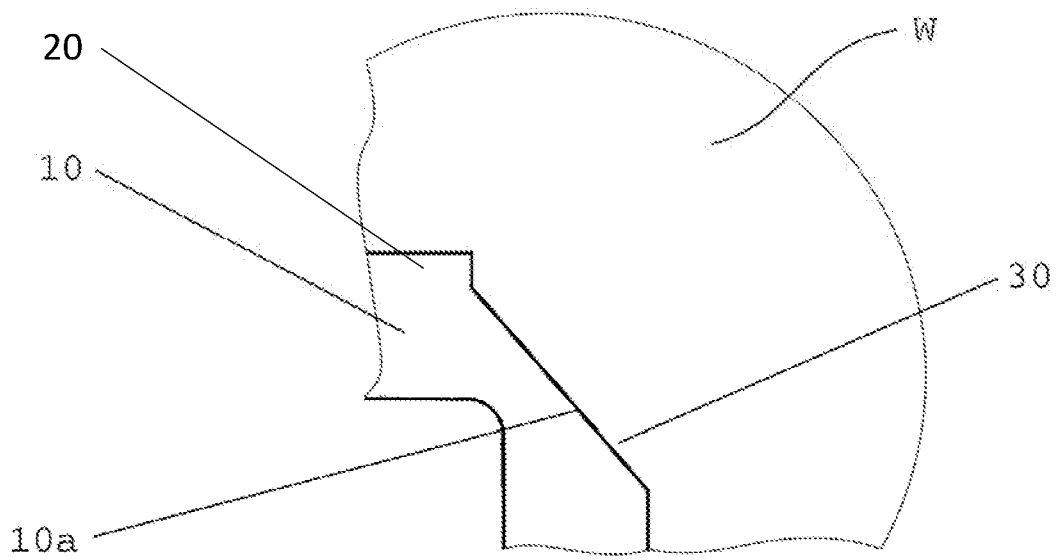

To further reduce the cavities H11 and H12 remaining in FIG. 4, or to preferably fill entirely or avoid these entirely, a complementary weakened area 10a is formed at the coating material 10 is formed according to a second embodiment of the present invention, as shown in FIG. 5, in addition to the chamfer 30 at the workpiece W. In other words, instead of forming the weakened area 10a on the coating material 10 into an arbitrary shape, this is formed such that after application to the workpiece W, i.e. following bending of the coating material 10 around the transition section, it is at least approximately complementary to the chamfer 30. On the basis of this second embodiment, it is thereby possible to even better reduce, and ideally entirely avoid, cavities between the coating material 10 and the workpiece which commonly occur owing to the weakened areas. Alternatively there is also the possibility to form the chamfer 30 or the curved section in the transition section of the two workpiece sides W1-W2 complementary to the weakened areas already present in the coating material. As furthermore revealed in FIG. 5, there is the possibility to provide an indent 20 which facilitates the technical production of the chamfer 30 (or the curved section) and can function as a stop for the coating material to ensure a clean positioning of the coating material 10 on the workpiece.

Figure 6:
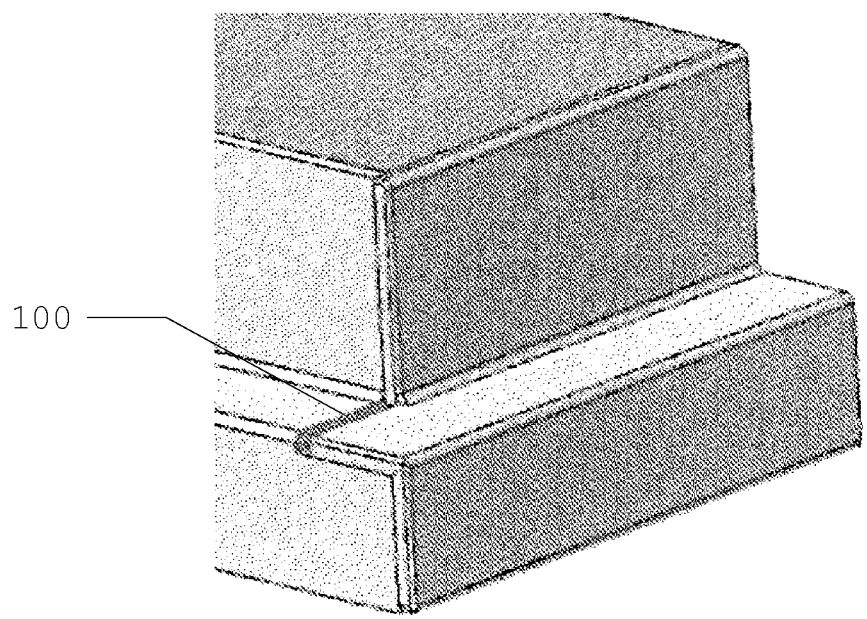
FIG. 6 shows a chamfer geometry of a connecting corner (mitre) according to the prior art.

FIG. 6 shows a chamfer geometry of a connecting corner (mitre) according to the prior art. As revealed by FIG. 6, the mitre of connecting corners with known coating methods has an open fermentation joint 100, which stays open or is optionally sealed. This, however, disrupts an appealing, high-quality optical appearance.

Figure 7:
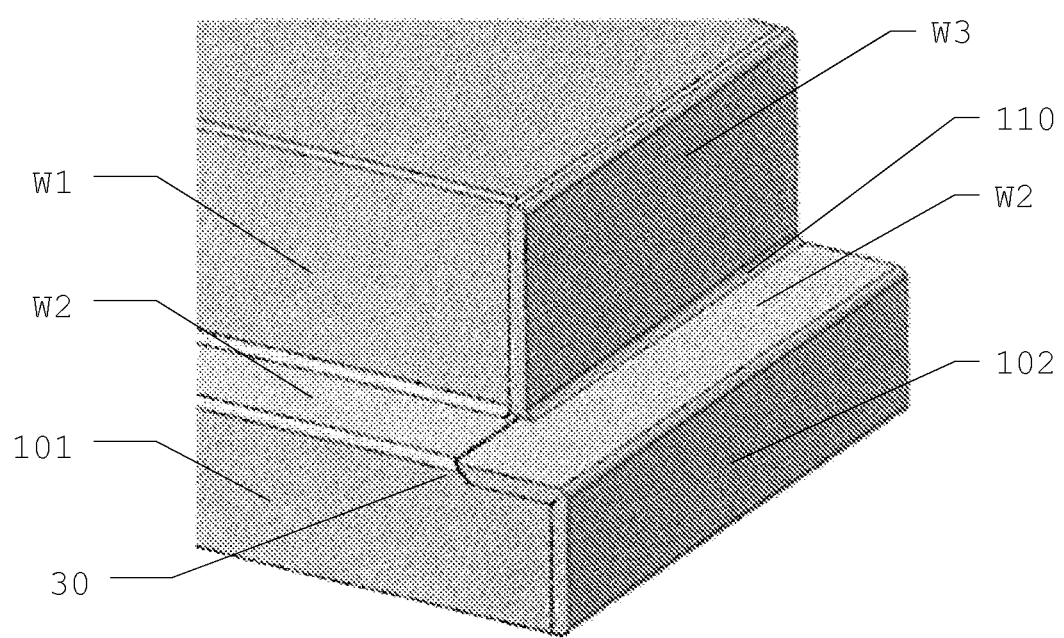
FIG. 7 shows a chamfer geometry of a connecting corner (mitre) according to one embodiment of the present invention, FIG. 8 schematically shows the cross-section of a coating material according to one embodiment of the present invention.

FIG. 7 shows a chamfer geometry of a connecting corner (mitre) according to an embodiment of the present invention. As revealed by FIG. 7, the geometry of the profile is no longer right-angled as in the prior art, but rather is provided with an additional chamfer 30. Accordingly, not only does the workpiece W have a chamfer 30 in the transition section 110 between the two workpiece sides W1-W2, but rather the transverse coating material 101 as well. This offers the advantage that at the connecting corners, the chamfer geometry of the provided transverse coating 101 with the additional longitudinal coating 102 lie on top of one another without any increase in profile. The mitre can be optically closed (entirely) by this. A disturbing mitre joint can therefore be avoided.

Figure 8:
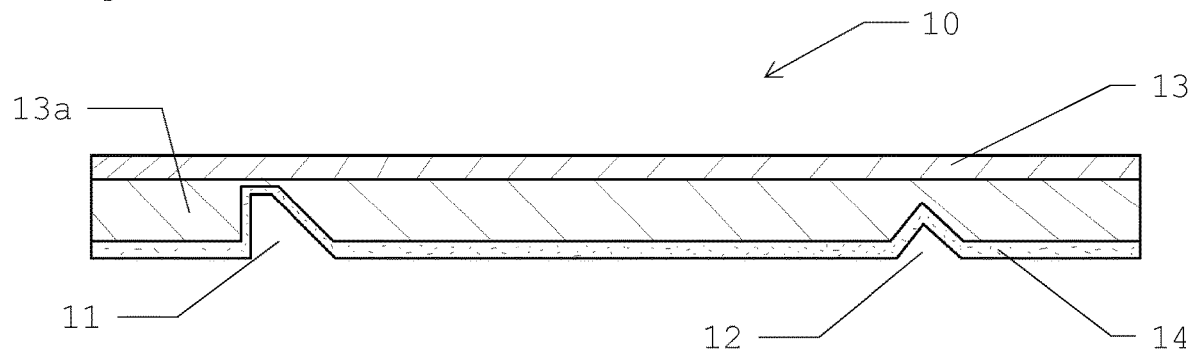

In FIG. 8, a cross-section of a coating material 10 according to an embodiment of the present invention is schematically shown. 12 shows a conventional weakened area in a V-shape, as it is oftentimes sufficient for outer corners. By contrast, the notch designated by 11 corresponds to a weakened area 10a according to the second embodiment of the present invention.

Here, the weakened area 11 has, for example, a chamfer which is formed such that, after application of the coating material 10 to a workpiece W, it approximately corresponds to the shape of the chamfer 30 applied to the workpiece W in the transition section according to the first embodiment of the present invention.

Figure 9:
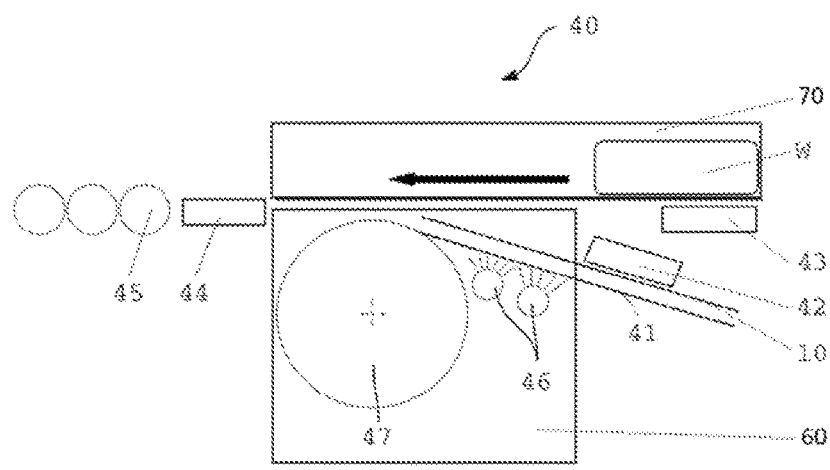
FIG. 9 shows an apparatus for performing the coating method according to the invention.

In FIG. 9, an apparatus 40 is shown for performing the coating method according to the invention. The apparatus 40 comprises a first feeding device 41, through which the coating material 10 to be applied to a workpiece W is fed. In the present example, two power sources 46 are provided in an area of the apparatus 40 close to a pressure roller 47 of a joining device 60, with in a modification of the shown apparatus, a power source 46 or several power sources can be provided as well. The at least one energy source 46 is selected from a laser, a hot air source, an infrared source, an ultrasound source, a magnetic field source, a microwave source, a plasma source, LED source and/or a gassing source.

Moreover, the shown apparatus 40 comprises a device 42 for placing the at least one weakened area 10a in the coating material 10, with the device 42 being, for example, arranged in the throughput direction of the coating material 10 in front of the two power sources 46. Furthermore, the device 40 apparatus 40 has a separating apparatus 43 which, is arranged as an example in the throughput direction of the workpiece W in front of the pressure roller 47. The workpiece W is fed here through a second feeding device 70. The separating apparatus 43 can be integrated into the apparatus 40 or it can be formed as an independent upstream apparatus. Using the separating apparatus 43, the workpiece W can be machined so as to separate such that the weakened area 10a of the coating material 10, which is positioned on the workpiece in the transition section after application of the coating material 10, is at least partially filled.

In the throughput direction of the coating material 10, the apparatus 40 furthermore subordinately comprises a shaping line 44 in which a further shaping step is performed after application of the coating material 10 to a workpiece as well as at least one pressing roller 45 by which a contact pressure is further applied during the hardening of the adhesive agent layer (adhesive layer 14) of the coating material 10 attached to a workpiece W.

Figure 10:
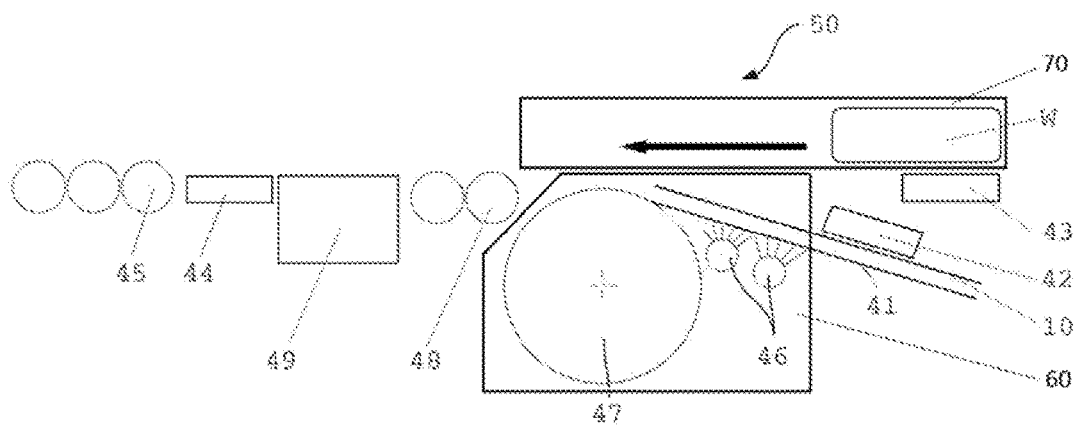
FIG. 10 shows an alternative apparatus for performing the coating method according to the invention.

FIG. 10 shows an alternative apparatus 50 for performing the coating method according to the invention. The apparatus 50 shown in FIG. 10 differs from the apparatus 40 described with reference to FIG. 9 to the extent that the apparatus 50 has further pressing rollers 48 which are arranged adjacent to the pressure roller 47 as well as a post-processing station 49 which is disposed between the further pressing rollers 48 and the forming line 44.

What is claimed is:

1. A method for coating uneven surfaces of a workpiece, having the steps:
    supplying two coating materials, the coating materials each comprising a corresponding weakened area, and
    applying the coating materials to at least two workpiece sides, respectively, which are arranged angularly to one another, the corresponding weakened area of each of the coating materials being positioned in a corresponding one of multiple transition sections of the at least two workpiece sides, and each of the transition sections of the at least two workpiece sides being formed to at least partially fill the corresponding weakened area,
    the method characterized in that a connecting corner of the workpiece is coated using the two coating materials,
    the connecting corner being formed by a longitudinal side and a transverse side of the workpiece, each of the longitudinal side and the transverse side having two of the at least two workpiece sides, one of the at least two workpiece sides of the transverse side being identical to one of the at least two workpiece sides of the longitudinal side, each of the transition sections of the at least two workpiece sides being formed with a curved section or a chamfer at an angle of 45°, and both coating materials, in a region extending away from one of the transition sections, have a complementary chamfer or curved section such that they can lie on top of one another without an increase in profile.

2. A method according to claim 1, characterized in that each of the transition sections has a chamfer with an indent and/or a curved section with an indent.

3. A method according to claim 2, characterized in that a size of the chamfer and/or the curved section is dependent on a thickness of each of the coating materials.

4. A method according to claim 1, characterized in that each weakened area is a recess or each weakened area is formed by a plurality of slots or blind holes in each of the coating materials, each weakened area being formed complementary to the transition section.

5. The method of claim 4, wherein each recess, when seen in cross-section of each of the coating materials, is V-shaped, W-shaped, right-angled or semicircular.

6. A method according to claim 1, characterized in that a carrier layer of at least one of the coating materials is formed at least in sections from PVC, polystyrene, PP, PE, polycarbonate and/or polymethylmethacrylate (PMMA).

7. A method according to claim 6, characterized in that each of the coating materials has a thickness between 0.5 mm-4 mm and an adhesive layer comprising a thickness of 0.1-0.3 mm.

8. A method according to claim 7, characterized in that the adhesive layer of each of the coating materials has color pigments.

9. The method of claim 8, wherein the color pigments have a same color as the carrier layer.

10. The method of claim 7, wherein the each of the coating materials has a thickness between 0.7-4 mm.

11. The method of claim 7, wherein the each of the coating materials has a thickness between 1.5-4 mm.

12. The method of claim 6, wherein the carrier layer of the at least one of the coating materials is formed at least in sections from one or more of a high pressure laminate (HPL), a continuous pressure laminate (CPL), a melamine paper, and a veneer.

13. A method according to claim 1, in which each weakened area is generated in the workpiece during a feeding of the coating material or during the application of the coating material.

14. A method according to claim 1, in which each of the coating materials has a carrier layer and an adhesive layer, the corresponding weakened area being generated on the carrier layer before application of the adhesive layer to the carrier layer or after application of the adhesive layer to the carrier layer.

15. The method of claim 1, wherein the workpiece comprises at least in sections wood, wood materials, or wood substitute materials.

16. The method of claim 1, wherein at least one of the transition sections of the at least two workpiece sides comprises an area of an inner corner.

17. The method of claim 1, wherein the longitudinal side and the transverse side are arranged at right-angles to one another.

18. The method of claim 1, wherein the at least two workpiece sides of each of the longitudinal side and the transverse side are arranged at right-angles to one another.

* * * * *